United States Patent [19]

Ide et al.

[11] 4,052,482
[45] Oct. 4, 1977

[54] VINYL CHLORIDE POLYMER COMPOSITION

[75] Inventors: Fumio Ide; Kazuo Kishida; Akira Hasegawa, all of Otake, Japan

[73] Assignee: Mitsubishi Rayon Co. Ltd., Tokyo, Japan

[21] Appl. No.: 634,284

[22] Filed: Nov. 21, 1975

Related U.S. Application Data

[63] Continuation-in-part of Ser. No. 427,550, Dec. 26, 1973, abandoned.

[30] Foreign Application Priority Data

Dec. 29, 1972 Japan .................................. 48-1161
Mar. 13, 1973 Japan ................................ 48-28594

[51] Int. Cl.$^2$ ....................... C08L 31/02; C08L 51/00
[52] U.S. Cl. ................................ 260/876 R; 260/885
[58] Field of Search ........................... 260/876 R, 885

[56] References Cited

U.S. PATENT DOCUMENTS 3,833,686   9/1974   Grochowski et al. ............ 260/876 R
3,859,389   1/1975   Carty et al. ............................ 260/885

OTHER PUBLICATIONS

Nielsen: Mechanical Properties of Polymers, Reinhold Publishing Corporation, New York, p. 27.
Encyclopedia of Polymer Science and Technology, John Wiley & Sons, Inc., New York, (1967), vol. 7, p. 461.

*Primary Examiner*—Murray Tillman
*Assistant Examiner*—Thurman K. Page
*Attorney, Agent, or Firm*—Armstrong, Nikaido & Marmelstein

[57] ABSTRACT

A thermoplastic vinyl chloride polymer composition superior in processing properties is provided. The composition comprises (I) a predominant amount of polyvinyl chloride or a copolymer predominantly comprised of vinyl chloride and (II) a minor amount of two stage sequentially produced methyl methacrylate composite polymer consisting essentially of 1 to 49 wt. % of component A polymerized from a monomer or monomer mixture of 90 to 100 wt. % of methyl methacrylate and 0 to 10 wt. % of at least one copolymerizable unsaturated monomer, said component A having a glass transition temperature of at least 75° C and a reduced viscosity of 1.8 to approximately 10; and 51 to 99 wt. % of component B polymerized onto or in the presence of said component A from a monomer mixture of 55 to 90 wt. % of a methyl methacrylate, 10 to 45 wt. % of an acrylic acid ester and 0 to 20 wt. % of at least one unsaturated monomer copolymerizable with methyl methacrylate and the acrylic acid ester, said component B exhibiting, if polymerized in the absence of said component A, a glass transition temperature of 25° to 80° C and a reduced viscosity of 1.8 to 10.

5 Claims, No Drawings

VINYL CHLORIDE POLYMER COMPOSITION

This is a continuation-in-part of United States patent application Ser. No. 427,550 filed Dec. 26, 1973, now abandoned.

The present invention relates to a vinyl chloride polymer composition having improved processing properties.

Polyvinyl chloride and a copolymer predominantly comprised of vinyl chloride are superior in many physical and chemical properties and hence widely used for the production of various shaped articles. However, polyvinyl chloride and vinyl chloride copolymers are inferior in processing properties. That is, these polymers must be processed at a temperature in an extremely limited range and close to the thermal decomposition temperature, and it takes a relatively long period of time to reach a gel state when processed.

By the term "processing" used herein is meant a process to which polymers are subjected in the course of being shaped into articles by a procedure such as, for example, melt extrusion, calendering or injection molding, and by the term "thermoforming" is meant a process or treatment to which a shaped article such as film or sheet is subjected in the course of being formed into finished articles by a procedure such as, for example, vacuum forming or thermoforming.

To incorporate a plasticizer therein in order to overcome the above-mentioned defects is widely known and used. However, the incorporation of a plasticizer causes some problems such as undesirable volatilization or exhalation of the plasticizer and reduction of mechanical properties of the shaped article.

On the other hand, it has been proposed to blend with a vinyl chloride polymer, a copolymer compatible with the vinyl chloride polymer, for example, a copolymer of methyl methacrylate and styrene and a copolymer of styrene and acrylonitrile, in order to improve the processing properties, and particularly, to provide a shaped article with a good smooth surface, to shorten the gelation time and to maintain a surface luster over a relatively long period of processing, or to provide a shaped article deeply drawn. However, this proposal also causes some serious problems. For example, the blending of a copolymer of methyl methacrylate and styrene contributes, only to a minor degree, to a reduction in the melt viscosity of the resulting vinyl chloride polymer composition and to an improvement of the surface luster of the resulting shaped article. The blending of a copolymer from styrene and acrylonitrile results in a polyvinyl chloride composition with a reduced thermal stability and does not contribute to the improvement of its processing properties such as shortening of the gelation time or enhancement of the thermoformability.

In general, the blending of a copolymer predominantly comprised of methyl methacrylate shortens the gelation time and enhances the elongation at break at a high temperature and therefore, enables the production of deeply drawn shaped articles, and is well suited for a vacuum forming or for a profile extrusion. However, the blending of a methyl methacrylate copolymer tends to produce a shaped article such as film, having undesirable unfused polymer particles, so called "fish-eyes". Such extruded films are inferior in their surface luster. Further, when the methyl methacrylate copolymer is added to a plasticized vinyl chloride polymer composition, the resulting shaped article has numerous unfused polymer particles because the methyl methacrylate copolymer is poor in its compatibility with a plasticized vinyl chloride polymer composition.

Therefore, it is one of the main objects of the present invention to provide a vinyl chloride polymer composition having improved processing properties such as an improved thermal stability, shortened gelation time and an improved thermoformability, and accordingly, resulting in shaped articles having a considerably reduced number of unfused polymer particles, even when the polymer composition is a plasticized polymer composition, and being superior in its transparency and surface luster.

Other objects and advantages will be apparent from the following description.

In accordance with the present invention, a thermoplastic vinyl chloride polymer composition of improved processability is provided which comprises I. 70 to 99.9 parts by weight of polyvinyl chloride or a copolymer containing no less than 80% by weight of vinyl chloride and no greater than 20% by weight of at least one other copolymerizable ethylenically unsaturated monomer, and II. 30 to 0.1 parts by weight of a two stage sequentially produced methyl methacrylate composite polymer consisting essentially of 1 to 49% by weight of component A polymerized from a monomer or monomer mixture of 90 to 100% by weight of methyl methacrylate and 0 to 10% by weight of at least one copolymerizable unsaturated monomer, said component A having a glass transition temperature ($T_g$) of at least 75° C and a reduced viscosity ($\eta$ sp/C) of 1.8 to approximately 10 as determined at 25° C on a solution in chloroform of a concentration of 0.10 g/100 ml; and 51 to 99% by weight of component B polymerized onto or in the presence of said component A from a monomer mixture of 55 to 90% by weight of a methyl methacrylate, 10 to 45% by weight of an acrylic acid ester and 0 to 20% by weight of at least one unsaturated monomer copolymerizable with methyl methacrylate and the acrylic acid ester, said component B exhibiting, if polymerized in the absence of said component A, a glass transition temperature ($T_g$) of 25° to 80° C and a reduced viscosity ($\eta$ sp/C) of 1.8 to 10 as determined at 25° C on a solution in chloroform of a concentration of 0.10 g/100 ml.

The present invention is particularly characterized by the methyl methacrylate composite polymer (II) to be blended with the vinyl chloride polymer (I). The composition of the two polymers (I) and (II) exhibits improved processing properties, as referred to hereinbefore, as well as said vinyl chloride polymer's own superior physical and chemical properties. The methyl methacrylate composite polymer (II) is a composite polymer prepared by the sequential two stage emulsion polymerization procedure wherein a monomer charge of component B is polymerized onto or in the presence of a preformed latex prepared by the polymerization of a monomer charge of component A. The methyl methacrylate composite polymer (II) is suitable for blending not only with an unplasticized vinyl chloride polymer but also with a plasticized vinyl chloride polymer.

The vinyl chloride polymer (I) is a polyvinyl chloride or a copolymer of no less than 80% weight of vinyl chloride and no greater than 20% by weight of at least one other copolymerizable ethylenically unsaturated monomer. The copolymerizable unsaturated monomer includes, for example, olefins such as ethylene and propylene, vinyl esters such as vinyl acetate, and esters of acrylic acid and methacrylic acid such as methyl methacrylate and methyl acrylate.

Component A of the methyl methacrylate composite polymer (II) performs the function of improving the processability of the resulting vinyl chloride polymer resin. For this function component A should possess a glass transition temperature ($T_g$) of at least 75° C and a reduced viscosity ($\eta$ sp/C) of 1.8 to 10 as determined at 25° C on a solution in chloroform of a concentration of 0.10 g/100 ml.

When the glass transition temperature of component A is lower than 75° C, the resulting vinyl chloride polymer composition becomes poor in processability, that is, it exhibits undesirably increased drawdown, low elongation at a high temperature, poor gelation properties and low extrusion rate upon melt-shaping. These disadvantages can be seen even when component A is of a high molecular weight.

When the reduced viscosity of component A is lower than 1.8, component A is not satisfactory as a processing aid. This would be similar to the generally accepted fact that, the higher than molecular weight of polymethyl methacrylate, the larger the processability thereof. The aforesaid minimum reduced viscosity corresponds to a molecular weight of approximately 510,000 as calculated according to Mark-Houwink-Sakuradas' formula $[\eta]=KM^a$ provided that $K=4.8 \times 10^{-5}$ and $a=0.8$ (from Polymer Hand Book published by Interscience Publishers Inc.). The upper limit of the reduced viscosity of component A is not critical, but usually at most approximately 10, which corresponds to the molecular weight of approximately 5,000,000. When the reduced viscosity is in excess of this upper limit, the vinyl chloride polymer composition is poor in surface luster.

Component A consists essentially of, in polymerized form, 90 to 100% by weight of methyl methacrylate and 0 to 10% by weight of at least one copolymerizable unsaturated monomer.

When the amount of methyl methacrylate is less than 90%, the resulting vinyl chloride polymer composition is poor in thermoformabilities such as elongation at break at a high temperature and the shortening of gelation time, although it is superior in transparency and dispersibility.

The copolymerizable unsaturated monomer used in the preparation of component A includes, for example, styrene, unsaturated nitriles such as acrylonitrile and methacrylonitrile, vinyl esters such as vinyl acetate, methacrylic acid esters other than methyl methacrylate such as n-butyl methacrylate and 2-ethylhexyl methacrylate, acrylic acid esters such as ethyl acrylate, 2-ethylhexyl acrylate and n-butyl acrylate, and polyfunctional monomer such as divinylbenzene and ethylene glycol dimethacrylate. These also may be used alone or in combination.

Component B performs the function of imparting to the processing aid improved dispersibility in a vinyl chloride polymer, and is characterized by the composition of monomers, the glass transition temperature and the reduced viscosity.

Component B consists essentially, in polymerized form, of 55 to 90% by weight of methyl methacrylate, 10 to 45% by weight of acrylic acid ester and 0 to 20% by weight of at least one unsaturated monomer copolymerizable with methyl methacrylate and the acrylic acid ester. When the amount of methyl methacrylate is less than 55% by weight, i.e. the amount of acrylic acid ester exceeds 45% by weight, based on the weight of component B, said component B results in a vinyl chloride polymer composition poor in transparency and thermal stability. In contrast, when the amount of methyl methacrylate exceeds 90% by weight, i.e. the amount of acrylic acid ester is less than 10% by weight, based on the weight of component B, a shaped article from the resulting vinyl chloride polymer composition contains a relatively great number of unfused polymer particles and is poor in surface luster. These are substantiated in Table II in Example 2.

Acrylic acid ester used in component B includes, for example, alkyl acrylates, the alkyl group having 1 to 12 carbon atoms, such as methyl acrylate, ethyl acrylate, n-butyl acrylate, isobutyl acrylate and 2-ethylhexyl acrylate, and substituted alkyl acrylates, the substituted alkyl group having 1 to 12 carbon atoms, such as chloroethyl acrylate. These acrylic acid esters may be used alone or in combination. Of these ethyl acrylate and n-butyl acrylate are preferable.

Component B may contain other unsaturated monomer copolymerizable with methyl methacrylate and the acrylic acid ester in an amount of no greater than 20% by weight. Such unsaturated monomers include, for example, styrene, unsaturated nitriles such as acrylonitrile and methacrylonitrile, vinyl esters such as vinyl acetate, methacrylic acid esters other than methyl methacrylate such as n-butyl methacrylate and 2-ethylhexyl methacrylate, and polyfunctional monomers such as divinylbenzene and ethylene glycol dimethacrylate. These also may be used alone or in combination.

Component B is characterized by possessing, if the monomer mixture of component B is polymerized in the absence of the component A, a glass transition temperature ($T_g$) of 25° to 80° C and a reduced viscosity ($\eta$ sp/C) of 1.8 to 10 as determined at 25° C on a solution in chloroform of a concentration of 0.10 g/100 ml.

When the glass transition temperature exceeds 80° C, the resulting processing aid is poor in dispersibility in a vinyl chloride polymer although the processing aid imparts the vinyl chloride polymer improved processing characteristics. These are substantiated in Table II, in Example 2, hereinafter referred to. In contrast, when the glass transition temperature is too low, it is difficult to form a finely divided powder of the processing aid when the emulsion is coagulated after polymerization. Therefore, a component B should exhibit a glass transition temperature of at least 25° C, preferably at least 40° C.

When the reduced viscosity of component B exceeds 10, the resulting vinyl chloride polymer composition becomes poor in surface luster. In contrast, it is lower than 1.8, the resulting vinyl chloride polymer composition is not satisfactory in processability.

The proportion of component A to component B should be such that the former is 1 to 49% by weight and the latter is 51 to 99% by weight. When the amount of component A exceeds 49% by weight, a shaped article from the resulting vinyl chloride polymer composition has relatively great number of unfused polymer particles. Particularly, the combination of component A with component B is poor in dispersability in a plasticized vinyl chloride composition. In contrast, when the amount of component A is less than 1% by weight, although the combination of component B with component A is superior in dispersibility in a vinyl chloride polymer, the resulting vinyl chloride polymer composition is poor in processability such as the shortening of gelation time and the thermoforming properties such as elongation at break at a high temperature. These are substantiated in Table III in Example 3 referred to hereinafter.

The methyl methacrylate composite polymer (II) is prepared by an emulsion polymerization. The emulsion polymerization may be performed by using known emulsifiers and a polymerization initiator including those soluble in oil and in water and a redox system. The polymerization degree can be controlled in a known manner, for example, by adding a chain transfer agent or varying the polymerization temperature.

The composite polymer is prepared by the sequential two-stage emulsion polymerization procedure wherein a monomer charge of component B is polymerized onto or in the presence of a preformed latex prepared by the emulsion polymerization of a monomer charge of component A, i.e. in the manner whereby a graft copolymer is prepared.

Apparently the particular manner whereby the methyl methacrylate composite polymer (II) is incorporated into the vinyl chloride polymer (I), is not critical. The methyl methacrylate composite polymer (II) can, for example, be simply physically blended in a dry state with the vinyl chloride polymer (I) by a conventional mixer such as a Henschel mixer. Further, small amounts of additives such as stabilizers colorants plasticizers, fillers, lubricants, impact modifiers and the like may be incorporated into the composition of the present invention, if desired.

In the practice of the present invention, at least 0.1% by weight, based on the weight of the vinyl chloride composition of the methyl methacrylate composite polymer (II), should be present in the resulting composition in order that at least some benefit of the present invention may be obtained. The incorporation of a large amount, i.e. exceeding 30%, of the methyl methacrylate composite polymer (II) results in the composition possessing inferior surface characteristics. It is therefore preferred that the methyl methacrylate composite polymer (II) is present in the vinyl chloride polymer composition in an amount of 0.1 to 30% by weight.

The invention will be further illustrated by the Examples, in which all parts and percentages are by weight unless otherwise specified.

The following abbreviations are employed in Tables given below.

MMA: Methyl methacrylate
EA: Ethyl acrylate
BMA: Butyl methacrylate
BuA: Butyl acrylate
2EHMA: 2-Ethylhexyl methacrylate
2EHA: 2-Ethylhexyl acrylate
MA: Methyl acrylate
AN: Acrylonitrile
St: Styrene
EDMA: Ethyleneglycol dimethacrylate

EXAMPLE 1

Preparation of methyl methacrylate composite polymer

A polymerization reactor equipped with a stirrer and a reflux condenser was charged with 200 parts of distilled water, 1.5 parts of dioctyl sodium sulfosuccinate, 0.2 part of ammonium persulfate, 30 parts of methyl methacrylate and 0.03 part of n-octyl mercaptan, and was flashed with nitrogen. Under the nitrogen atmosphere, the mixture was heated to a temperature of 65° C while being stirred, and the stirring was continued at this temperature for 4 hours to substantially complete the reaction. The component A so obtained proved to possess a reduced viscosity of 5.0.

To the polymer latex of component A, a mixture of 48 parts of methylmethacrylate and 12 parts of butyl acrylate was gradually added and then maintained at 65° C for one hour while being stirred. The methyl methacrylate composite polymer so obtained is designated as specimen (b).

The polymer (b) had a reduced viscosity ($\eta$ sp/C) of 3.6. Thus, the reduced viscosity of component B in the polymer (b) proved to be 3.0 as calculated based upon the formula, $[\eta] = w_A[\eta_A] + w_B[\eta_B]$, where $[\eta]$ = viscosity of the composite polymer (b), $[\eta_A]$ and $[\eta_B]$ = viscosities of components A and B, respectively, and $w_A$ and $w_B$ = weight fractions of components A and B, respectively. For reference purposes, a monomer mixture of the component B was polymerized in the absence of the component A and under the same conditions as set forth above. The resulting polymer had a reduced viscosity of 3.0.

The reduced viscosity of component B of other samples hereinafter referred to mean that which is calculated from the reduced viscosities of the respective component A and composite polymer (II) according to the aforesaid formula.

Following the above polymerization procedure, samples (a) and (c) were prepared which were substantially the same as specimen (b) set forth above except for their reduced viscosities.

Similarly, specimen (d) and control specimens (1) through (6) were prepared which had the characteristics shown in Table I, below.

Preparation of vinyl chloride polymer compositions according to the invention and evaluation thereof Three parts of each specimen, 100 parts of polyvinyl chloride having an average degree of polymerization of 715, 1.8 parts of dibutyltin maleate, 1.0 part of butyl stearate and 0.7 part of a lubricant were blended in a Henschel mixer and the blending was continued until the temperature of the blend polymer reached 120° C.

Processing characteristics of the resultant polymer compositions were determined as follows.

1. Unfused polymer particle content

The polymer composition was extruded into a sheet of 0.2 mm in thickness by an extruder having an inner diameter of 25 mm and provided with a T-die. The temperature of the T-die was 190° C. The sheet specimen was graded A, B, C and D according to the numbers of unfused polymer particles (so called "fish eyes") having a more than 0.2 mm diameter occurring in a unit area (30×30 cm) of the sheet specimen, as observed with the naked eye, i.e., grades A, B, C and D respectively mean that the sheet specimen contains little or no (less than 6) fish eyes; some (6 to 20) fish eyes; a considerable number of (21 to 50) fish eyes, and; a great many (more than 50) fish eyes.

2. Brilliance

The brilliance of the sheet specimen extruded through the T-die was observed with the naked eye and graded A, B, C and D as follows.
A: Very good
B: Good
C: Poor D: Very poor 3. Haze The sheet specimen prepared as set forth in item (1) were laminated and pressed at a temperature of 185° C into a plate of 2 mm in thickness. Haze in % was determined in accordance with Japanese Industrial Standard K-6714. The smaller the haze value, the greater the transparency of the specimen.

4. Gelation time

The polymer composition was kneaded by using a Brabender plasti-corder under the following conditions: temperature of kneading, 190° C; number of revolution, 30 rpm; amount of polymer charged, 60 g, and; time period of preheating, 5 minutes. Gelation time was expressed by the time period in minutes until the kneading resistance reached maximum. As the gelation time becomes shorter it becomes easier is to process the polymer composition.

A plasticized vinyl chloride polymer composition was also prepared by blending 4 parts of each methyl methacrylate composite polymer specimen, 100 parts of polyvinyl chloride having an average polymerization degree of 1100, 40 parts of dioctyl phthalate, 6 parts of an epoxide stabilizer and 0.8 part of a lubricant in a Henschel mixer until the temperature of the blend polymer in the mixer reached 105° – 110° C.

The drawdown of the plasticized vinyl chloride polymer composition and the dispersibility of the methyl methacrylate composite polymer in the plasticized vinyl chloride polymer composition were tested as follows.

5. Drawdown

Drawdown effect was observed on parison formed by using a blow-forming machine having a diameter of 45 mm, and graded as follows.

A: Little or no drawdown effect was observed.

B: Drawdown effect was observed to a minor extent.

C: Drawdown effect was observed to a good extent.

D: Drawdown effect was observed to a great extent, which is approximately similar to that of the plasticized polyvinyl chloride to which no methyl methacrylate composite polymer has been added.

6. Dispersibility in plasticized vinyl chloride polymer

The plasticized vinyl chloride polymer composition was kneaded on a 6 inch roll mill at a temperature of 155° C. The sheets were laminated and pressed into a plate of 2 mm in thickness. The plate specimen was graded A, B, C and D according to the dispersibility expressed in terms of haze determined on a plate specimen of a 4×5 cm size. In this rating, grades, A, B, C and D respectively mean that haze of the plate specimen is less than 10; at least 10 but less than 20; at least 20 but less than 30; and at least 30, respectively.

Results are shown in Table I.

Table I

| | Composite polymer | | | | | | | | | | Processing performances | | | |
| | Component A | | | | Component B | | | | | Unfused polymer particle content | Brilliance | Dispersibility in plasticized PVC | Haze (%) | Gelation time (min) | Drawdown |
| Specimen | MMA | BuA | Tg(° C) | ηsp/C | MMA | BuA | Tg(° C) | ηsp/C | ηsp/C | | | | | | |
| Invention | | | | | | | | | | | | | | | |
| (a) | 30 | 0 | 105 | 10 | 48 | 12 | 52 | 3.0 | 5.1 | A | B | A | 8.0 | 0.2 | A |
| (b) | 30 | 0 | 105 | 5.0 | 48 | 12 | 52 | 3.0 | 3.6 | A | A | A | 8.1 | 0.2 | A |
| (c) | 30 | 0 | 105 | 1.8 | 48 | 12 | 52 | 3.0 | 2.6 | A | A | A | 8.1 | 0.5 | B |
| (d) | 27 | 3 | 76.5 | 3.0 | 48 | 12 | 52 | 3.0 | 3.0 | A | A | A | 8.3 | 0.2 | AB |
| Control | | | | | | | | | | | | | | | |
| (1) | 24 | 6 | 52 | 3.0 | 48 | 12 | 52 | 3.0 | 3.0 | A | B | A | 13 | 0.5 | B |
| (2) | 20 | 10 | 25 | 3.0 | 48 | 12 | 52 | 3.0 | 3.0 | A | B | A | 21 | 0.7 | B |
| (3) | 0 | 25 | −65 | 3.0 | 60 | 15 | 52 | 3.0 | 3.0 | A | B | A | 37 | 1.2 | C |
| (4) | 24 | 6 | 52 | 0.5 | 48 | 12 | 52 | 3.0 | 2.25 | A | B | A | 13.2 | 2.8 | D |
| (5) | 24 | 6 | 52 | 0.28 | 48 | 12 | 52 | 3.0 | 2.18 | A | C | A | 14.1 | 4.5 | D |
| (6) | 24 | 6 | 52 | 0.01 | 48 | 12 | 52 | 3.0 | 2.10 | A | C | A | 13.8 | 5.2 | D |

*Reduced viscosity as measured at 25° C in a solution in chloroform at a concentration of 0.1 g of the polymer per 100 ml.

As seen from the results shown in Table I, when sp/C of component A becomes large, the sheet becomes poor in surface luster (specimen (a)). In contrast, when sp/C becomes too small, e.g. smaller than 1.8, the sheet becomes unsatisfactory particularly in drawdown (specimen (a) and control specimens (4), (5) and (6)). Particularly, control specimens (4), (5) and (6), the components A of which possess molecular weights of 100,000, 50,000 and 7,500, respectively, do not meet the purpose of the invention. When the content of butyl acrylate in component A exceeds 10%, the sheet is not satisfactory particularly in transparency as well as gelation time and drawdown even though the component A possesses a desired molecular weight (control specimens (1), (2) and (3)).

EXAMPLE 2

A polymerization reactor similar to that employed in Example 1 was charged with 200 parts of distilled water, 1.5 parts of dioctyl sodium sulfosuccinate, 0.2 part of ammonium persulfate, 40 parts of methyl methacrylate and 0.01 part of n-octyl mercaptan. The mixture was stirred under an atmosphere of nitrogen at a temperature of 65° C for 4 hours to substantially complete the polymerization (component A). The component A had a reduced viscosity ($\eta$ sp/C) of 5.0.

In a manner similar to that set forth in Example 1, various monomer mixtures (component B) shown in Table II were separately polymerized in the presence of the preformed latex of component A. The reduced viscosities of specimens (h), (i) and (j) were varied by varying the amount of the chain transfer agent used. Results are shown in Table II.

Table II

| | Composite polymer | | | | | | | | | | Processing performances | | | | |
| | Component A | | | | Component B | | | | | Unfused polymer particle content | Brilliance | Dispersibility in plasticized PVC | Haze (%) | Gelation time (min) | Drawdown |
| Specimen | MMA | BuA | Tg(° C) | ηsp/C | MMA | BuA | Tg(° C) | ηsp/C | ηsp/C | | | | | | |
|---|---|---|---|---|---|---|---|---|---|---|---|---|---|---|---|
| Control (7) | 40 | 0 | 105 | 5.0 | 60 | 0 | 105 | 3.0 | 3.8 | C | B | D | 12.1 | 0.2 | AB |
| Invention (e) | 40 | 0 | 105 | 5.0 | 54 | 6 | 80 | 3.0 | 3.8 | AB | A | B | 9.6 | 0.2 | A |
| (f) | 40 | 0 | 105 | 5.0 | 48 | 12 | 52 | 3.0 | 3.8 | A | A | A | 8.0 | 0.2 | A |
| (g) | 40 | 0 | 105 | 5.0 | 42 | 18 | 31 | 3.0 | 3.8 | A | A | A | 8.0 | 0.3 | A |
| Control (8) | 40 | 0 | 105 | 5.0 | 33 | 27 | 3.4 | 3.0 | 3.8 | Could not be coagulated | | | | | |
| Invention (h) | 40 | 0 | 105 | 5.0 | 42 | 18 | 31 | 10 | 8.0 | A | C | A | 18.1 | 0.2 | A |
| (i) | 40 | 0 | 105 | 5.0 | 42 | 18 | 31 | 5.0 | 5.0 | A | A | A | 8.3 | 0.2 | A |
| (j) | 40 | 0 | 105 | 5.0 | 42 | 18 | 31 | 1.8 | 3.1 | A | A | A | 8.1 | 0.2 | B |

As seen from Table II, when the content of methyl methacrylate in component B exceeds 90% and the $T_g$ of component B exceeds 80° C, the dispersibility becomes poor (control specimen (7)). The $T_g$ of component B of control specimen (8) is lower than room temperature and, therefore, the polymer emulsion cannot be coagulated.

EXAMPLE 3

Following the procedure set forth in Example 1, various methyl methacrylate composite polymers were prepared and tested. Results are shown in Table III.

Table III

| Specimen | Component A | | | | Composite polymer Component B | | | | ηsp/C | A/B by wt. | Processing performances | | | | | |
|---|---|---|---|---|---|---|---|---|---|---|---|---|---|---|---|---|
| | MMA | BuA | Tg(°C) | ηsp/C | MMA | BuA | Tg(°C) | ηsp/C | | | Unfused polymer particle content | Brilliance PVC | Dispersibility in plasticized (%) | Haze (min) | Gelation time down | Draw |
| Control (9) | 0 | 0 | — | — | 80 | 20 | 52 | 3.0 | 3.0 | 0/100 | A | B | A | 16.2 | 1.0 | C |
| Invention (k) | 10 | 0 | 105 | 5.0 | 72 | 18 | 52 | 3.0 | 3.2 | 10/90 | A | AB | A | 11.3 | 0.8 | AB |
| (l) | 30 | 0 | 105 | 5.0 | 56 | 14 | 52 | 3.0 | 3.6 | 30/70 | A | A | A | 8.0 | 0.2 | A |
| Control (10) | 50 | 0 | 105 | 5.0 | 40 | 10 | 52 | 3.0 | 4.0 | 50/50 | AB | A | AB | 8.3 | 0.2 | A |
| (11) | 70 | 0 | 105 | 5.0 | 24 | 6 | 52 | 3.0 | 4.4 | 70/30 | C | B | C | 8.9 | 0.2 | A |
| (12) | 100 | 0 | 105 | 5.0 | 0 | 0 | — | — | 5.0 | 100/0 | D | C | D | 13.6 | 0.2 | A |
| (13) | 48 | 12 | 52 | 0.2 | 40 | 0 | 105 | 3.0 | 1.32 | 60/40 | A | C | D | 14.1 | 16.8 | D |
| (14) | 48 | 12 | 52 | 0.2 | 32 | 8 | 52 | 3.0 | 1.32 | 60/40 | A | C | A | 16.8 | 19.5 | D |

As seen from Table III, when the processing aid is composed of components B only, the sheet is poor in surface luster, transparency and drawdown (control specimen (9)). When the content of component A exceeds 50%, the dispersibility becomes poor (control specimens (11), (12) and (13)).

EXAMPLE 4

Following the general procedure as described in Example 1, composite polymers (m), (n), (o) and (p), as indicated in Table IV below, were prepared. Using each polymer so obtained, an unplasticized vinyl chloride polymer composition was prepared and tested for its processing performances in a manner as described in Example 1. All the tested compositions had good processability, as revealed from Table IV.

Table IV

| | Composite polymer composition | | | | | | | | | Processing performances | | |
|---|---|---|---|---|---|---|---|---|---|---|---|---|
| | Component A | | | | | | Component B | | | Unfused polymer particle content | Haze (%) | Gelation time (min) |
| Specimen | MMA | AN | St | BuA | EDMA | ηsp/C | MMA | BuA | ηsp/C | | | |
| Invention | | | | | | | | | | | | |
| (m) | 28.5 | 1.5 | — | — | — | 5.0 | 56 | 14 | 3.0 | A | 8.6 | 0.2 |
| (n) | 28.5 | — | 1.5 | — | — | 5.0 | 56 | 14 | 3.0 | A | 9.1 | 0.3 |
| (o) | 28.5 | — | — | 1.5 | — | 5.0 | 56 | 14 | 3.0 | A | 8.9 | 0.2 |
| (p) | 29.9 | — | — | — | 0.1 | — | 56 | 14 | 3.0 | A | 9.5 | 0.2 |

EXAMPLE 5

Following the procedure as described in Example 1, various methyl methacrylate composite polymers (q), (r), (s) and (t), as indicated in Table V below, were prepared. Using each composite polymer so obtained, an unplasticized vinyl chloride polymer composition was prepared and tested for its processing performances in a manner as described in Example 1. The results are shown in Table V.

As seen from Table V, processing performances of all the compositions are quite satisfactory.

Table V

| | Composite polymer compositon | | | | | | | | | | Processing performances | | |
|---|---|---|---|---|---|---|---|---|---|---|---|---|---|
| | Component A | | | Component B | | | | | | | Unfused polymer particle content | Haze (%) | Gelation time (min) |
| Specimen | MMA | BuA | ηsp/C | MMA | BuA | MA | AN | St | BMA | EDMA | ηsp/c | | |
| Invention | | | | | | | | | | | | | |
| (q) | 40 | 0 | 5.0 | 45 | 15 | — | — | — | — | — | 3.0 | A | 8.3 | 0.2 |
| (r) | 40 | 0 | 5.0 | 45 | — | 5 | 5 | 5 | — | — | 3.0 | A | 8.4 | 0.2 |
| (s) | 40 | 2 | 5.0 | 45 | 13 | — | — | — | — | — | 3.0 | A | 8.2 | 0.2 |
| (t) | 40 | 4 | 5.0 | 45.9 | 10 | — | — | — | — | 0.1 | 3.0 | A | 8.2 | 0.2 |

EXAMPLE 6

In this Example, processing performances of vinyl chloride polymer compositions containing specimen (f), prepared as described in Example 2, were compared with those of the corresponding vinyl chloride polymer compositions without the specimen (f), the latter being referred to as Control.

1. An unplasticized vinyl chloride polymer composition containing 3 parts of specimen (f) was prepared in a manner as described in Example 1. It was then extruded into a sheet of 0.2 mm in thickness by T-die extrusion using an extruder, under the conditions described in Example 1. The sheets were pressed at a temperature of 180° C into a plate of 1 mm thick. A dumbbell-shaped specimen having a sample length of 20 mm was cut from the plate and tested for elongation at a temperature of 125° C with a rate of elongation of 50 mm/min. The specimen containing 3 parts of specimen (f) had an elongation of 465%, whereas the control specimen which contained no methyl methacrylate polymer composition exhibited an elongation of about 200%.

2. A pressed plate of 1 mm in thickness, prepared in a manner as described in 1) was heated at a temperature of 160° C and then subjected to vacuum forming. The control plate containing no methyl methacrylate composite polymer tended to break and could not be vacuum formed. Whereas the corresponding plate containing 3 parts of specimen (f) was able to be deeply drawn.

3. Using a blow-forming machine having an inner diameter of 40 mm, a suitably blended PVCl composition was tested for its shapability. The tested formulation comprised 90 parts of polyvinyl chloride having an average polymerization degree of 715, 10 parts of a MBS resin ("Metablen" C-200; a registered trade mark of methyl methacrylate/butadiene/styrene terpolymer supplied by Mitsubishi Rayon Co., Ltd.), 1.5 parts of an octyl tin mercaptide stabilizer, 1.5 parts of an epoxide stabilizer, 1.0 part of butyl stearate, 0.5 part of a polyglycol ester of fatty acids and 1.0 part of specimen (f). At the end of 8 hours operation surfaces of the flow bottle still remained clear and glossy, revealing that shapability of the blend was satisfactorily good. The test was repeated with a suitably blended PVCl composition which was similar to that employed in the first test except that 1.0 part of specimen (f) was omitted. In the test of the control composition, surfaces of the blow bottle became coarse within about 1 hour operation, and marked flow marks were observed on the bottle surfaces. Thus, it can be seen that addition of an effective amount of specimen (f) to a PVCl formulation will ensure a prolonged, stable operation of a blow forming machine.

4. Using an extruder having an inner diameter of 40 mm, a pipe was prepared by extruding a vinyl chloride polymer composition comprised of 100 parts of a vinyl chloride polymer having an average polymerization degree of 1,200, 2.2 parts of a lead stabilizer, 0.7 part of butyl stearate, 0.3 part of stearic acid, 10 parts of a commercially available modifier for enhancing weatherability and impact strength of a vinyl chloride polymers, and 1 part of specimen (f). Extruding performances were quite satisfactory, and pipe products well unfused and having a good surface gloss could be stably prepared over a prolonged period of time. Whereas with a comparable control composition wherein the specimen (f) was omitted, pipe products obtained were poor in surface gloss and had flow marks on their surfaces.

5. Using 3 parts of specimen (f), a plasticized vinyl chloride polymer composition was prepared and made into sheets in a manner as described in Example 1, (6). The sheets were then pressed into a plate of 2 mm in thickness under conditions as in Example 1, (6). From the plate so prepared, a dumb-bell-shaped specimen suitable for texting tensile properties was made. Upon tensile measurements, the specimen exhibited a tensile strength and an elongation, both higher than those of a comparable control specimen which did not contain.

6. An unplasticized vinyl chloride composition prepared by blending 100 parts of a copolymer composed of 10% of vinyl acetate with 90% of vinyl chloride and having an average polymerization degree of 800, 2.2 parts of dibutyl tin maleate, 1.0 part of butyl stearate, 0.5 part of stearic acid and 3.0 parts of specimen (f) was tested for its gelation time in a plasti-corder under conditions as described in Example 1, (4). It took only 0.2 minute to reach the maximum torque. Whereas, a comparable control composition which did not contain specimen (f) required 3.5 minutes of gelation time under the same testing conditions.

What we claim is:

1. A thermoplastic vinyl chloride polymer composition of improved processability which comprises
   1. 70 to 99.9 parts by weight of polyvinyl chloride or a copolymer of no less than 80% by weight of vinyl chloride and no greater than 20% by weight of at least one other copolymerizable ethylenically unsaturated monomer, and
   2. 0.1 to 30 parts by weight of a two stage sequentially produced methyl methacrylate composite polymer consisting essentially of
      1 to 49% by weight of component A polymerized from a monomer or a monomer mixture of 90 to 100% by weight of methyl methacrylate and 0 to 10% by weight of at least one copolymerizable unsaturated monomer, said component A having a glass transition temperature (tg) of at least 75° C and a reduced viscosity ($\eta$ sp/C) of 1.8 to approximately 10 as determined at 25° C on a solution in chloroform of a concentration of 0.10g/100ml, and ;
      51 to 99% by weight of component B polymerized onto or in the presence of said component from a monomer mixture of 55 to 90% by weight of methyl methacrylate, 10 to 45% by weight of acrylic acid ester and 0 to 20% by weight of at least one unsaturated monomer copolymerizable with methyl methacrylate and the acrylic acid ester, said component B exhibiting, if polymerized in the absence of said component A, a glass transition temperature (Tg) of 25° to 80° C and a reduced viscosity ($\eta$ sp/C) of 1.8 to 10 as determined at 25° C on a solution in chloroform of a concentration of 0.10g/100ml.

2. A thermoplastic vinyl chloride polymer composition according to claim 1, wherein said acrylic acid ester used for the preparation of component B is an alkyl acrylate, the alkyl group having 1 to 12 carbon atoms, or a substituted alkyl acrylate, the substituted alkyl group having 1 to 12 carbon atoms.

3. A thermoplastic vinyl chloride polymer composition according to claim 2, wherein said alkyl acrylate or substituted alkyl acrylate is at least one compound selected from the group consisting of methyl acrylate, ethyl acrylate, n-butyl acrylate, isobutyl acrylate and 2-ethylhexyl acrylate; and chloroethyl acrylate.

4. A thermoplastic vinyl chloride polymer composition according to claim 1, wherein said copolymerizable unsaturated monomer used for the preparation of component B is selected from styrene, acrylonitrile, methacrylonitrile, vinyl acetate, n-butyl methacrylate, 2-ethylhexyl methacrylate, divinylbenzene and ethylene glycol dimethacrylate.

5. A thermoplastic vinyl chloride polymer composition according to claim 1, wherein said copolymerizable unsaturated monomer used for the preparation of component A is at least one compound selected from the group consisting of styrene, acrylonitrile, methacrylonitrile, vinyl acetate, n-butyl methacrylate, 2-ethylhexyl methacrylate, ethyl acrylate, 2-ethylhexyl acrylate, n-butyl acrylate, divinylbenzene and ethylene glycol dimethacrylate

* * * * *